United States Patent [19]

Larson

[11] 4,235,074
[45] Nov. 25, 1980

[54] LOAD CHAIN END STOP

[75] Inventor: William M. Larson, Forrest City, Ark.

[73] Assignee: Eaton Corporation, Cleveland, Ohio

[21] Appl. No.: 48,294

[22] Filed: Jun. 13, 1979

[51] Int. Cl.³ ............................................ F16G 13/12
[52] U.S. Cl. ......................................... 59/93; 254/389
[58] Field of Search .......................... 59/93, 78, 84, 35; 294/74, 78 R, 78 A; 254/167, 169, 197

[56] References Cited

U.S. PATENT DOCUMENTS

| | | | |
|---|---|---|---|
| 1,458,354 | 6/1923 | Neller | 254/167 |
| 2,658,722 | 11/1953 | Coffing | 254/167 |
| 2,773,668 | 11/1956 | Robins | 254/167 |
| 3,810,359 | 5/1974 | Schreyer | 59/93 |

FOREIGN PATENT DOCUMENTS 1031155  5/1958  Fed. Rep. of Germany .............. 59/78

Primary Examiner—Francis S. Husar
Assistant Examiner—Gene P. Crosby
Attorney, Agent, or Firm—R. J. McCloskey; F. M. Sajovec, Jr.

[57] ABSTRACT

An end stop for a link chain hoist (10) in which a ring (28) is received through the opening (22a) of the next-to-last load chain link (20a) on one side of the third last link (20c), with the last load chain link (20b) received in the opening (22a) on the other side of the third last link to force the next to the last link sideways relative to the remainder of the load chain to define an end stop engageable with the chain guide (16) of the hoist.

3 Claims, 3 Drawing Figures

LOAD CHAIN END STOP

The present invention relates to an improved end stop for preventing the loose end of a hoist load chain from running through a hoist chain guide.

U.S. Pat. No. 3,810,359 discloses an end stop wherein a pull link is fixed to the last link of a link type load chain to maintain the last link in a sideways position in relation to the next-to-last link. The last link is thus arranged to engage the chain guide of the hoist to prevent passage of the loose end of the chain therethrough. The pull link also serves to facilitate pulling the load chain through the hoist. The main advantages of using one of the chain links as an end stop are that the end stop, being a hardened chain link, does not tend to become forced into the chain guide, and that a relatively low-cost, soft pull link can be used.

The present invention is an improvement over the end stop disclosed in the above patent in that it uses the last load chain link in combination with a simple pull ring to turn the next-to-last load chain link sideways, thus eliminating the need for a specially formed pull link to turn the last link sideways. The pull link contemplated can be a stock ring of the type heretofore used as a combination pull ring and chain stop, so that no additional tooling is required to form and apply the pull link.

Other advantages of the invention will be apparent from the following description when taken in connection with the accompanying drawing, wherein.

Figure 1:
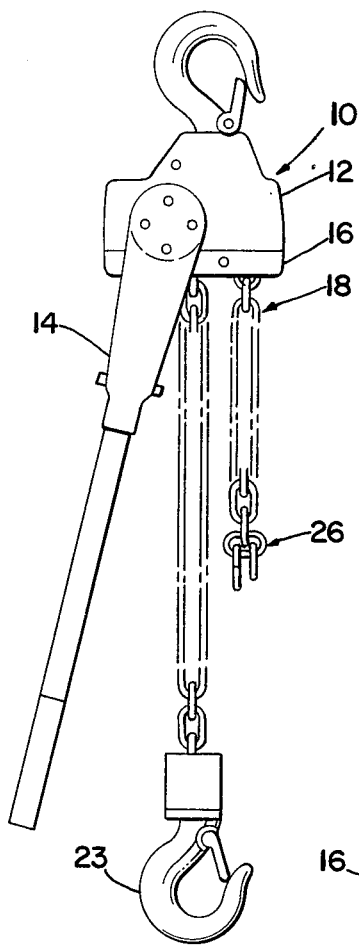
FIG. 1 is a side elevation view of a hand lever hoist incorporating the invention.

Referring to FIG. 1, there is illustrated a hand lever hoist 10 including a body 12 enclosing a chain-engaging sheave (not shown), an operating lever 14, a chain guide 16, and a load chain 18. Hoists of this type are well-known in the art, and the hoist per se will not be described in greater detail herein. Also, it will be apparent that the present invention is applicable to other types of link chain hoists as well.

The load chain 18 is a standrad, high-strength chain commonly used in hoist applications, and comprises a plurality of welded links 20 interfitting with openings 22 of adjacent links in end to end relationship. In accordance with known design practice the length of each chain link 20 is substantially greater than its width. The chain 18 has a load hook 23 attached to one end, while the other end hangs free.

Figure 2:
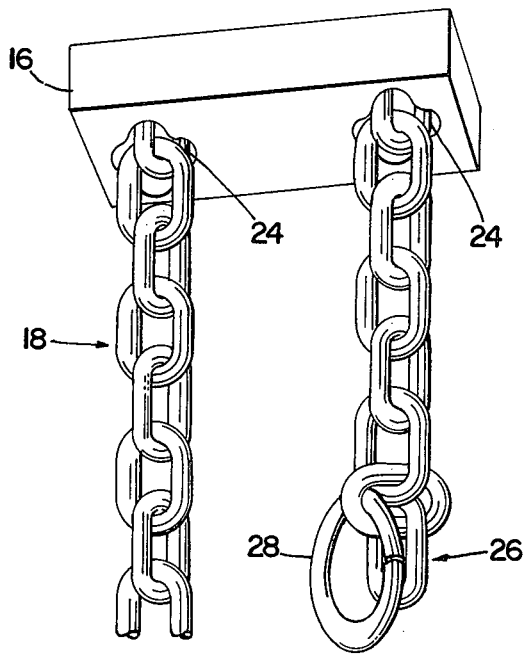
FIG. 2 is a perspective view of a portion of the hoist shown in FIG. 1, showing the chain guide, chain, and end stop.
Figure 3:
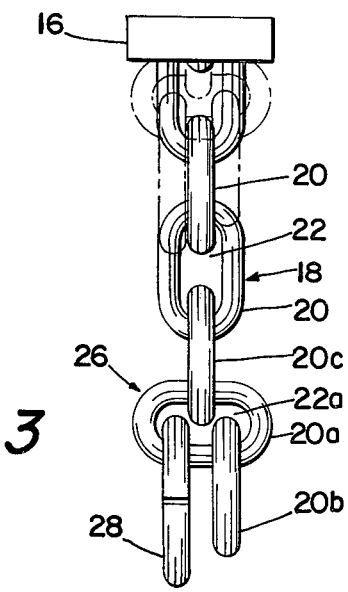
FIG. 3 is an enlarged side elevation view of the end stop.

Referring particularly to FIG. 2, the chain guide 16, which can be formed as part of the hoist body 12, or attached thereto, includes guide openings 24 which are of clover leaf or cross-shaped configuration to insure that the adjacent chain links 20 are properly aligned perpendicularly to one another for passage into the hoist body in engagement with the load sheave. The end stop of the present invention, designated generally by the numeral 26, comprises a pull ring 28 received through the opening 22a of the next-to-last load chain link 20a, and the last load chain link 20b, also received through the opening 22a. Referring particularly to FIGS. 2 and 3, when the end stop 26 is assembled the pull ring 28 and the last link 20b are arranged such that they are received on either side of the third last link 20c so that the next-to-last link 20a is forced sideways relative to the rest of the load chain 18.

When the hoist 10 is operated, and a load engaged by the hook 23 is lowered until the next-to-last link 20a reaches the chain guide 16, the sideways oriented next-to-last link will engage the chain guide 16 as shown in broken line in FIG. 3. Since the sideways oriented link 20a is a part of the hardened load chain 18, it will not tend to enter into the chain guide 16.

Since the pull ring 28 never contacts the chain guide 16, it can be formed as a split ring of a relatively soft material which can be easily assembled to the load chain 18 after the chain is run through the openings 24 and over the load sheave. The ring need not be formed in any special shape and can be a relatively soft material of a diameter suitable for the size of load chain used and of a diameter suitable for pulling an unloaded chain through the hoist by pulling the ring by hand.

I claim:

1. In a hoist including a link type load chain; a chain guide for controlling the passage of the load chain therethrough with the chain links end to end in mutually perpendicular relationship; and an end stop for preventing an end of said chain from running through said chain guide, said end stop comprising a ring received through the opening of the next-to-last link of said load chain on a first side of the third last link of said chain, with the last link of said load chain received through the opening of said next to last on the opposite side of said third last link to cause said next-to-last link to be oriented in side to side relationsip to the remainder of the end to end oriented load chain links.

2. In a hoist including a chain guide having an opening for orienting a link type load chain with the links thereof in mutually perpendicular end to end relationship; a link type load chain; and an end stop formed at an end of said load chain, said end stop being defined by a ring received through the opening of the next-to-last link of said load chain on one side of the third last link of said chain, and the last link of said load chain received through said opening in the second last link on the other side of said third last link, thereby forcing said next-to-last link to be oriented sideways in relation to the end to end oriented links of the remainder of said load chain.

3. Apparatus as claimed in claims 1 or 2, in which said ring comprises a generally circular ring formed of a material which is softer than the material from which said load chain is formed.

* * * * *